(12) United States Patent
Kotary et al.

(10) Patent No.: US 11,550,592 B2
(45) Date of Patent: Jan. 10, 2023

(54) METHODS AND APPARATUS TO UTILIZE NON-VOLATILE MEMORY FOR COMPUTER SYSTEM BOOT

(71) Applicant: Intel Corporation, Santa Clara, CA (US)

(72) Inventors: Karunakara Kotary, Portland, OR (US); Sean Dardis, Hillsboro, OR (US); Michael Kubacki, Hillsboro, OR (US); Ankit Sinha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,047

(22) Filed: Jun. 29, 2018

(65) Prior Publication Data

US 2019/0042272 A1 Feb. 7, 2019

(51) Int. Cl.
*G06F 9/4401* (2018.01)
*G06F 9/445* (2018.01)
*G06F 3/06* (2006.01)
*G06F 12/02* (2006.01)
*G06F 12/06* (2006.01)
*G06F 12/0868* (2016.01)

(52) U.S. Cl.
CPC ............ *G06F 9/4401* (2013.01); *G06F 3/061* (2013.01); *G06F 3/0629* (2013.01); *G06F 3/0644* (2013.01); *G06F 3/0679* (2013.01); *G06F 9/44505* (2013.01); *G06F 12/0246* (2013.01); *G06F 12/0638* (2013.01); *G06F 12/0646* (2013.01); *G06F 12/0868* (2013.01); *G06F 2212/1024* (2013.01); *G06F 2212/206* (2013.01); *G06F 2212/225* (2013.01); *G06F 2212/401* (2013.01); *G06F 2212/7206* (2013.01)

(58) Field of Classification Search
CPC ...... G06F 3/061; G06F 3/0629; G06F 3/0644; G06F 3/0679; G06F 12/0246; G06F 12/0638; G06F 12/0646; G06F 9/44505; G06F 12/0868; G06F 2212/1024; G06F 2212/206; G06F 2212/225; G06F 2212/401; G06F 2212/7206
See application file for complete search history.

(56) References Cited

U.S. PATENT DOCUMENTS

| | | | | |
|---|---|---|---|---|
| 10,089,472 | B2* | 10/2018 | Jeansonne | G06F 9/4401 |
| 2007/0055856 | A1* | 3/2007 | Zimmer | G06F 9/4403 |
| | | | | 713/2 |
| 2013/0283079 | A1* | 10/2013 | Puthiyedath | G06F 1/3234 |
| | | | | 713/323 |
| 2013/0290759 | A1* | 10/2013 | Kumar | G06F 1/3275 |
| | | | | 713/323 |
| 2013/0326206 | A1* | 12/2013 | Lueck | G06F 9/4418 |
| | | | | 713/2 |

(Continued)

*Primary Examiner* — Nimesh G Patel
(74) *Attorney, Agent, or Firm* — Hanley, Flight & Zimmerman, LLC (57) ABSTRACT

Methods, apparatus, systems and articles of manufacture are disclosed to utilize non-volatile memory for computer system boot. An example processor platform includes a non-volatile memory coupled to a processing unit via a bus, and a microcontroller to: configure the processing unit to store, on the non-volatile memory, a heap and a stack for execution of boot code, and configure the processing unit to execute the boot code stored on the non-volatile memory.

20 Claims, 7 Drawing Sheets

(56) References Cited

U.S. PATENT DOCUMENTS

| | | | |
|---|---|---|---|
| 2014/0082262 A1* | 3/2014 | Nachimuthu | G06F 9/4401 711/103 |
| 2014/0359224 A1* | 12/2014 | Bisht | G06F 12/0848 711/129 |
| 2016/0314002 A1* | 10/2016 | Khatri | G06F 9/4403 |
| 2017/0249002 A1* | 8/2017 | Costa | G06F 9/4403 |

* cited by examiner

METHODS AND APPARATUS TO UTILIZE NON-VOLATILE MEMORY FOR COMPUTER SYSTEM BOOT

FIELD OF THE DISCLOSURE

This disclosure relates generally to memory in computing devices, and, more particularly, to methods and apparatus to utilize non-volatile memory for computer system boot.

BACKGROUND

Many computing systems rely on a basic input/output system (BIOS) enabling cache as random access memory (RAM) (CAR) so a processor cache can serve as a data store for early boot code until main memory is initialized upon resuming operation (e.g., from a sleep state such as the S5/S4/S3 sleep states). The cache is utilized in the early boot environment to provide a heap and call stack for code execution (e.g., C code execution). Once main memory is initialized, the BIOS copies code and data (sometimes including decompressing the code) from a non-volatile storage medium (e.g., flash memory such as Serial Peripheral Interface (SPI) NOR flash memory) to main memory and disables CAR mode. In platforms with non-volatile block media that do not support the ability to be memory mapped (e.g. eMMC, UFS, NVMe) the code is additionally executed from CAR.

The figures are not to scale.

DETAILED DESCRIPTION

Utilizing CAR mode prevents a cache of a processor from serving the processor in a hierarchical caching model thereby forfeiting the benefits of a hierarchical cache. In systems in which the code executes from CAR, the pre-memory firmware size is bounded by the size of the last-level cache (LLC) of the processor. By using CAR, BIOS must set up CAR and then copy data to CAR to set up memory. Once memory is initialized, BIOS must copy data from storage media to memory. CAR is limited in size and limits what can be done in the early boot phase. Furthermore, decompressing and copying boot code on every boot is slow and extends the time required for booting. The CPU cannot operate as a hierarchical cache during CAR mode impacting early boot performance.

In addition to data, code must also be loaded into CAR since block media does not provide the ability to be mapped to memory. Current boot flows require copying the code from the block media device through on-die SRAM to the processor LLC every boot. In addition, in current platform designs, special boot flows were added such as support in microcode to support cache flush from Level 1 Data cache to Level 2 cache so the code can be moved to Level 1 Instruction cache. This not only impacts boot time every boot but also introduces unique platform bring up instructions that can confuse customers.

In some examples disclosed herein, a non-volatile memory (e.g., a non-volatile memory that supports two level (2LM) operation) is utilized for persistent storage of system memory (e.g., Far Memory). In some examples, BIOS stores a BIOS image uncompressed (e.g., the entire BIOS image) on non-volatile memory. A memory controller may be utilized to save the state of memory in powered-off states. In some such examples, a processor reset vector is moved to fetch code from the non-volatile memory. The BIOS is then free to use cache on the processor as a hierarchical cache (instead of CAR) and the non-volatile memory as memory to execute code in order to initialize silicon and main memory. Using this approach may save time on BIOS copying and decompressing, setup/take down of CAR, etc. In some such examples, the firmware can boot using a unified flow without storage-specific drivers regardless of non-volatile storage technology (e.g. embedded Multi-Media Controller (eMMC), SPI NOR, universal flash storage (UFS), etc.) while reducing boot time and supporting increasingly complex BIOS initialization.

In some current platforms, code is loaded through an intermediary on-die memory area such as static RAM (SRAM). Since on die memory is limited in size, a ring buffer load mechanism is used to load the firmware in chunks through SRAM which impacts boot time. In some disclosed examples, using the non-volatile memory allows for increased available memory space and avoids usage of an intermediary on die memory area every boot.

Many block devices are single headed so they can only be accessed by a single entity unless device ownership is exchanged. For example, a platform that stores the host firmware on eMMC boot partitions may need to access the non-volatile boot media from both the host CPU firmware and a separate microcontroller. The host processor may need to read non-volatile firmware data such as a unified extensible firmware interface (UEFI) variable from the Replay Protected Memory Block (RPMB) while the microprocessor must move code pages from the eMMC boot partition to main memory (DRAM). Coordinating and serializing such demands throughout the boot is a complex and error prone process. For example, during microprocessor ownership of the non-volatile storage media, UEFI firmware executing on the host processor sends host embedded controller interface (HECI) messages through a storage proxy interface to access the boot media. Such an approach has a negative impact on system performance due to inter-processor communication overhead and system robustness due to a dependency on the survivability of the microprocessor operations. If the microprocessor were disabled or in an error state, the storage media would be inaccessible to the host firmware. In some examples disclosed herein, the non-volatile storage media functionality is replaced with utilization of two level memory such as 3D XPoint™ memory which eliminates the single ownership restriction and supports a unified boot flow even if other non-volatile media such as SPI NOR or UFS are present.

Marketed under the Intel Optane® Technology brand, 3D XPoint™ is a new class of non-volatile memory with unique characteristics relative to existing memories such as dynamic RAM (DRAM) and NAND. The performance offered is similar to DRAM but with persistence like that offered by NAND memory. 2LM refers to using 3D XPoint memory or any other at least partially non-volatile memory as a combined volatile memory, persistent memory, and general storage solution. In such an approach, the single 2LM device is exposed to a computing platform as three separate devices. In the 2LM architecture, the first level memory (DRAM) is referred to as Near Memory and the 2LM memory partitions are referred to as Far Memory. When Near Memory is available (after DRAM initialization), the hardware transparently manages a smaller DRAM memory capacity as a memory side cache to reduce access latency to the Far Memory.

By using the 2LM memory as a persistent memory that does not lose state to maintain a host system firmware image (i.e. BIOS or UEFI firmware), the firmware may co-exist alongside the operating system usage of the persistent storage (e.g., persistent memory aware file system support was released in Windows® OS RS1 and Linux® distributions).

Some types of 2LM memory include one or more of the following features:

2LM memory may be attached to the processor's memory bus for memory semantics load/store accesses.

2LM memory does not lose contents when power-loss occurs

2LM memory may function as a memory-mapped I/O (MMIO) accessible fast storage device so that software may access the 2LM memory the same way as accessing other memory on the system memory bus (e.g., DRAM, SPI NOR, etc.).

2LM memory may work in the context of an existing memory hierarchy.

2LM memory may be faster than current memory mapped storage media such as SPI NOR.

2LM Far Memory may be high capacity compared with processor cache and main memory.

Figure 1:
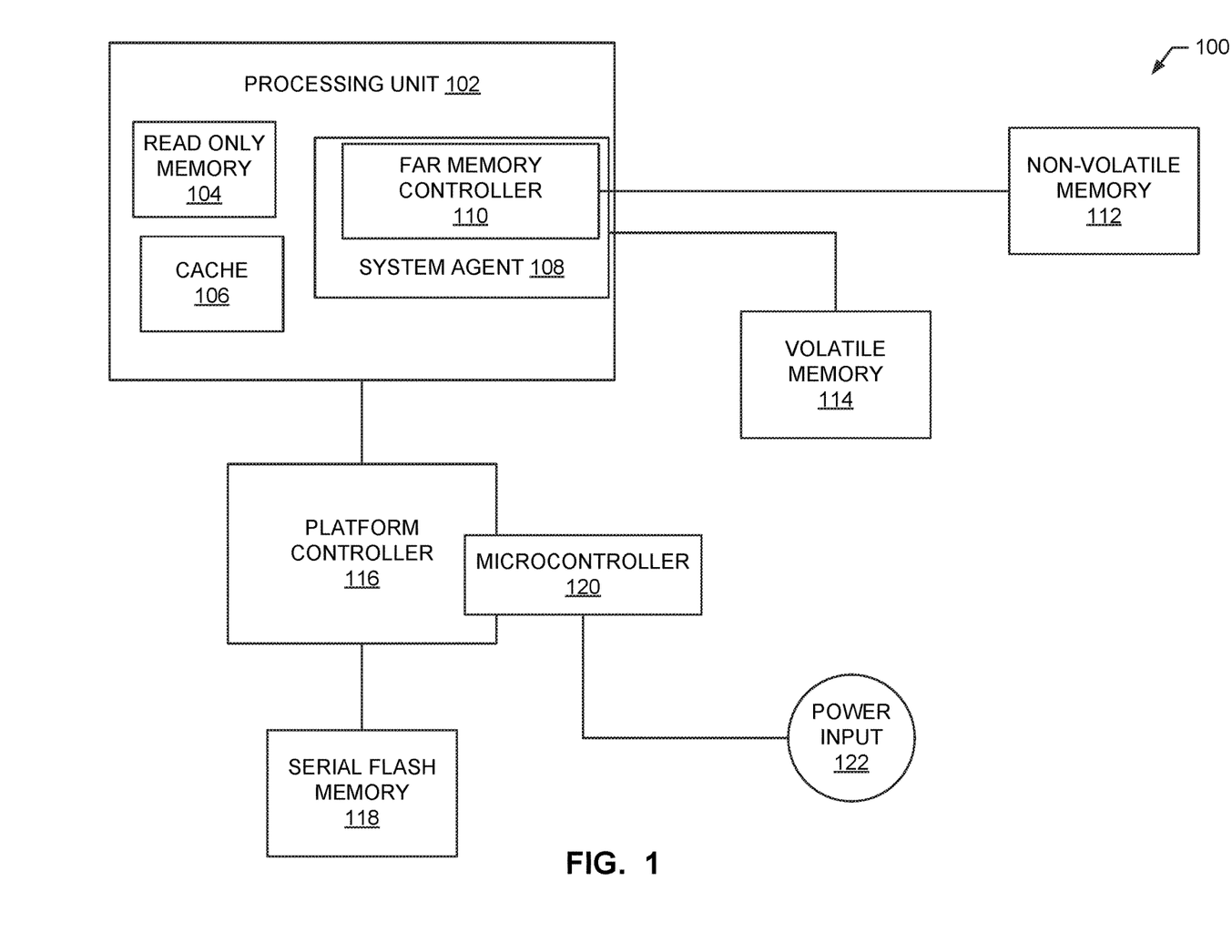
FIG. 1 is a block diagram of an example processor platform implemented according to the teachings of this disclosure to utilize non-volatile memory for booting a computer system.

FIG. 1 is block diagram of an example processor platform 100 implemented in accordance with methods and apparatus disclosed herein. The example processor platform 100 includes an example processing unit 102, which includes an example read only memory (ROM) 104, an example cache 106, an example system agent 108 that includes an example far memory controller 110. The example processor platform 100 also includes an example non-volatile memory 112, an example volatile memory 114, an example platform controller 116, an example serial flash memory 118, an example microcontroller 120, and an example power input 122.

The example processing unit 102 is a central processing unit (CPU) in a computing device such as a personal computer or a server. Alternatively, the processing unit 102 may be any type of processing device included in any type of computing device.

The example processing unit operates by executing boot code that is stored in a memory identified by a CPU reset vector. The CPU reset vector identifies a memory location (e.g., a memory address, a pointer, etc.) at which the processing unit 102 can find the first instruction to execute as soon as the processing unit 102 is ready to begin (e.g., after a system reset or power on event).

The example read only memory 104 of the processing unit is a memory built into the processing unit 102 that stores instructions for initializing the processing unit 102 and/or components of the processing unit 102. According to the illustrated example, the read only memory 104 stores instructions that may be executed by the processing unit 102 to initialize the example far memory controller 110 of the example system agent 108.

The example cache 106 is a volatile storage included in the processing unit 102 for storing instructions currently in use by the processing unit 102 and/or recently used by the processing unit 102. For example, the cache 106 may be a small but fast memory that is close to the processing unit 102 to provide rapid access to needed instructions (e.g., instructions retrieved from other slower memory locations).

In some examples, the processing unit 102 may include multiple caches 106. For example, the processing unit 102 may include multiple levels of cache 106 of different sizes in which the speed decreases as the size increases (e.g., Level 1 cache is fast but small, Level 2 cache is slower than Level 1 cache but is larger than Level 1 cache, etc.).

While the example read only memory 104 and the example cache 106 are included in the package of the example processing unit 102, in other examples, one or both of the read only memory 104 and the cache 106 may be outside the package and communicatively coupled to the processing unit 102.

The example system agent 108 is a controller that performs functions of the processing unit 102 that are outside of the core functions of the processing unit. For example, according to the illustrated example, a core of the processing unit includes an arithmetic logic unit (ALU), a floating point unit (FPU), the read only memory 104, and the cache 106 (e.g., Level 1 cache and Level 2 cache). In such an example, the system agent 108 performs functionality outside the core but still very close to the core (e.g., closer than components that are outside of the package of the processing unit 102) to achieve high performance. For example, the system agent 108 of the illustrated example includes the example far memory controller 110 and is interfaced with the volatile memory 114. In addition, the system agent 108 includes other functionality not shown in FIG. 1 (e.g., Level 3 cache, bus connections to other components of the platform 100, etc.).

The example far memory controller 110 is a controller and interface for managing communication between the example processing unit 102 and the example non-volatile memory 112. For example, the far memory controller 110 detects the type of memory of the non-volatile memory 112, configures the operating mode of the non-volatile memory (e.g., one level memory, two level memory, etc.).

Figure 6:
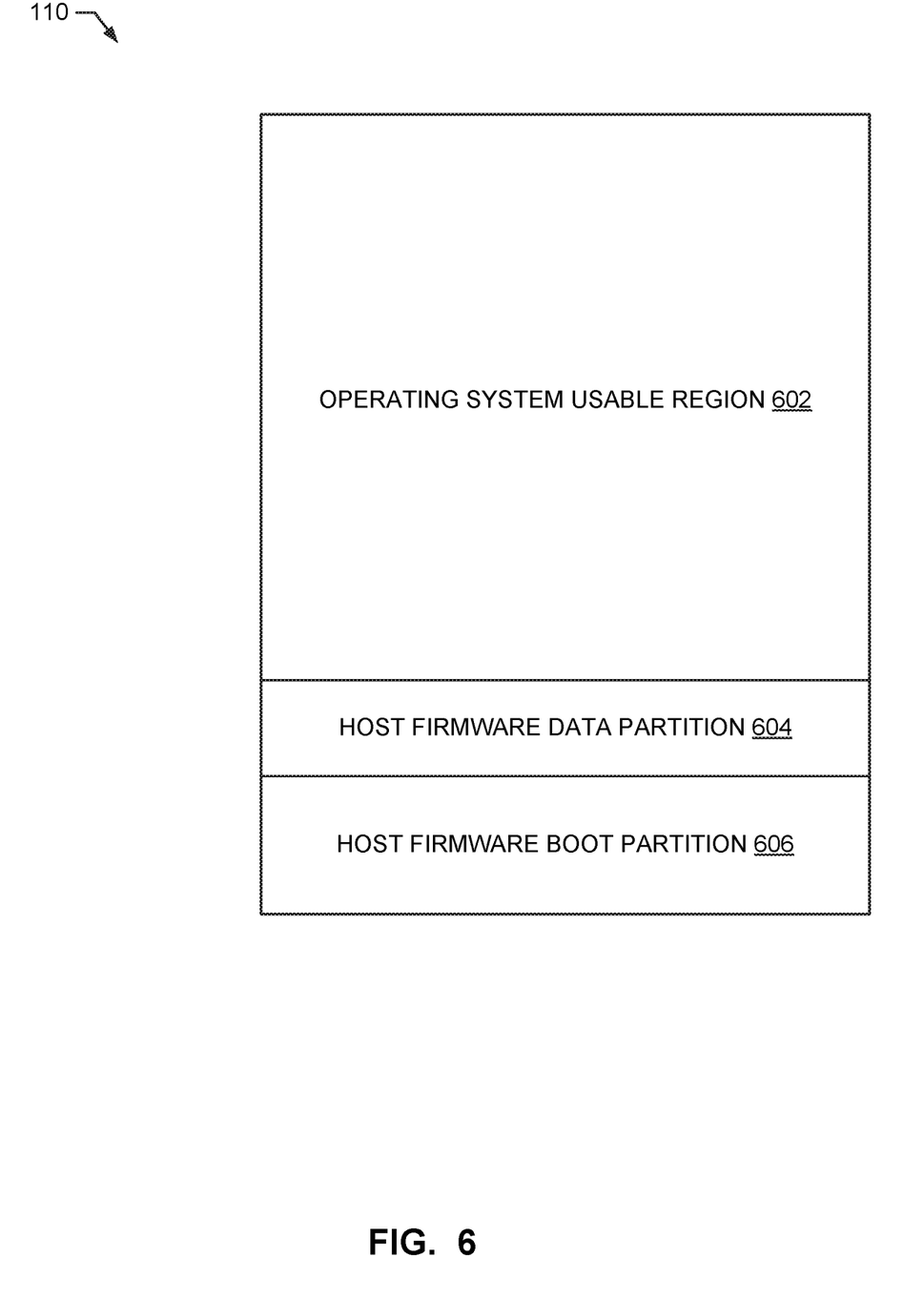
FIG. 6 is a block diagram illustrating an example configuration of the non-volatile memory of FIG. 1.

The example non-volatile memory 112 is a non-volatile memory storage device that supports two level memory operation. For example, the non-volatile memory 112 may be 3D XPoint™ Memory from Intel Corporation® or any other type of two level memory supporting one or more of the features and benefits of two level memory described above. According to the illustrated example, the non-volatile memory 112 includes more storage space (e.g., more than 32 GB) than the read only memory 104, the cache 106, and the serial flash memory 118. Alternatively, other sizes of the non-volatile memory 112 may be utilized and/or the non-volatile memory 112 may include multiple memory devices. According to the illustrated example, the non-volatile memory 112 is configured with partitions to support the processing unit 102 utilizing the non-volatile memory 112 for multiple purposes (e.g., an OS Usable region, a host firmware data partition, and a host firmware boot partition as illustrated in FIG. 6).

The example volatile memory 114 is DRAM to be used as main memory by the example processing unit 102. Alternatively, the volatile memory 114 may be any other type of volatile memory to be used for any other purpose by the example processing unit 102.

The example platform controller 116 is a platform control hub (PCH) chipset that provides data paths and functions for interfacing the processing unit 102 with peripherals and components of the platform 100. According to the illustrated example, the platform controller 116 interfaces with the serial flash memory 118 and the microcontroller 120. Alternatively, the platform controller 116 may be any other type of interface between the processing unit 102 and peripherals/components of the platform 100.

The example serial flash memory 118 of the illustrated example is SPI NOR flash memory. The SPI NOR flash memory may store early boot code for operation of the processing unit 102. According to the illustrated example, the boot code is stored in a compressed format due to the minimal size of the serial flash memory 118. In some examples disclosed herein the serial flash memory 118 is eliminated or used for other purposes when the early boot code is stored at the non-volatile memory 112. For example, the non-volatile memory 112, as disclosed herein, is utilized to store the early boot code in an uncompressed format, which is possible due to the increased size of the non-volatile memory 112.

The example microcontroller 120 is an input/output controller that control operation of the peripherals and interfacing of components of the platform 100 with the example processing unit 102. According to the illustrated example, the microcontroller 120 interfaces with the power input 122 to receive input controlling operating states of the platform 100 (e.g., power on, power off, sleep, wake, hibernate, etc.). The example microcontroller 120 controls mapping of the memory int the example non-volatile memory 112 to the processor reset vector to cause the processing unit 102 to look to the non-volatile memory 112 for instructions to execute when initializing. According to the illustrated example, the microcontroller 120 is implemented as part of the platform controller 120 and accesses the non-volatile memory 112 via the processing unit 102. Alternatively, the microcontroller 120 may be communicatively coupled to the non-volatile memory 112 via a path that does not pass through the processing unit 102 (e.g., a direct connection between the microcontroller 120 and the non-volatile memory 112). In other examples, the microcontroller 120 may be implemented as part of the processing unit 102.

The example power input 122 is a power button that may be pressed to provide operation instructions to the example microcontroller 122. Alternatively, the power input 122 may be any other type of input (e.g., a switch, a soft input, an instruction interface, etc.).

In operation of the example platform 100 of FIG. 1, after the power input 122 of FIG. 1 is activated, the example microcontroller 120 begins initializing components of the platform 100 including the non-volatile memory 112. The example microcontroller 120 causes an area of the non-volatile memory 112 to be exposed to the processing unit 102 as memory mapped IO. Accordingly, the non-volatile memory may be mapped to the reset vector of the processing unit 102 so that the processing unit 102 loads the first boot instructions from the non-volatile memory 112. Furthermore, the processing unit 102 may be set to utilize the memory mapped IO portion of the non-volatile memory 112 for storage of a heap and stack for execution, which frees up the space in cache 106 normally consumed by the heap and stack.

Figure 2:
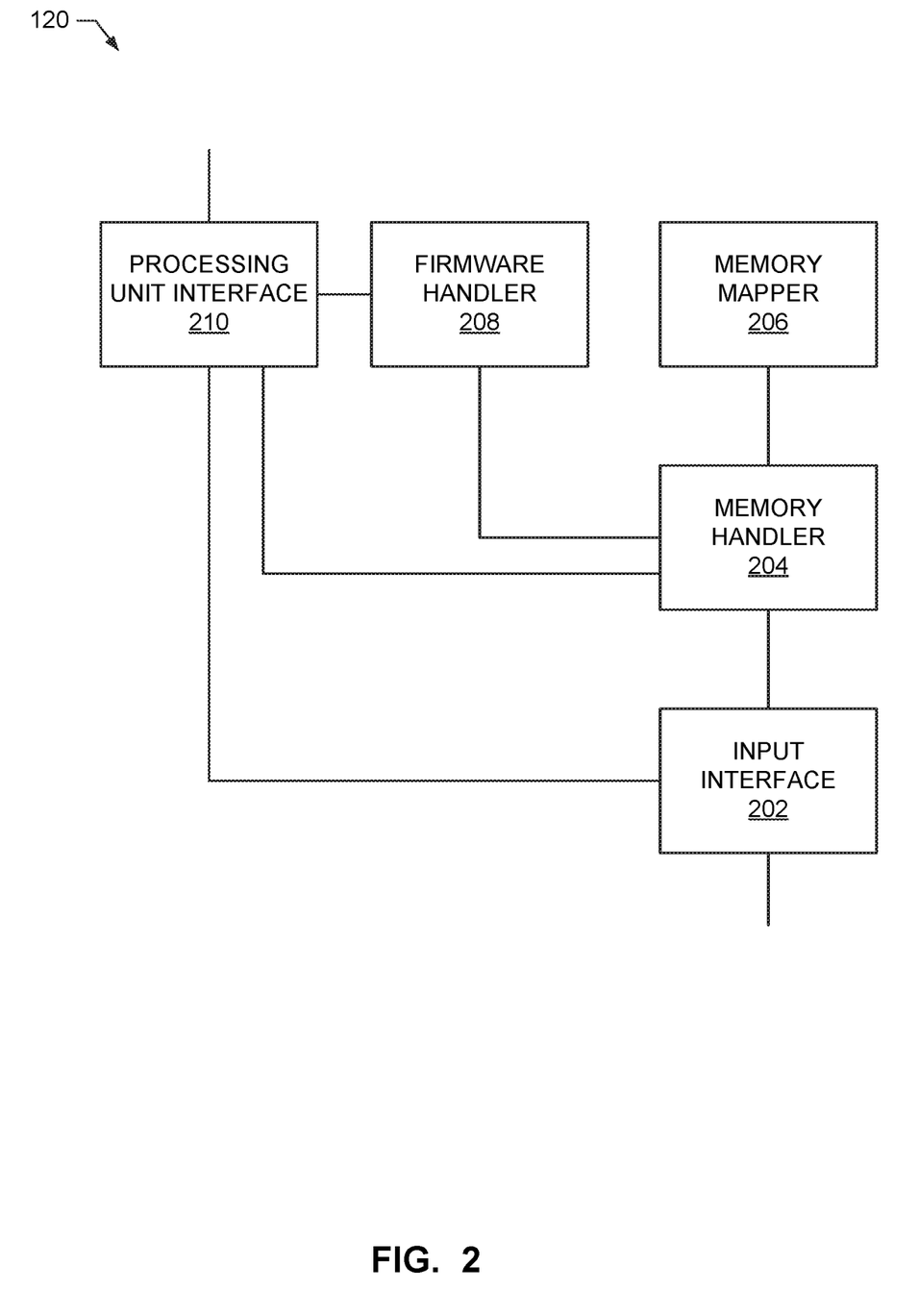
FIG. 2 is a block diagram of an example implementation of the example microcontroller of FIG. 2.

FIG. 2 is a block diagram of an example implementation of the microcontroller 120 of FIG. 1. The example microcontroller 120 includes an example input interface 202, an example memory handler 204, an example memory mapper 206, an example firmware handler 208, and an example processing unit interface 210.

The example input interface 202 is a communication interface for interfacing with the example power input 122. The input interface 202 may additionally interface with any other components (e.g., a keyboard, a sensor, etc.). The example input interface 202 communicates signals/information from the power input 122 to the memory handler 204 and the processing unit interface 210.

The example memory handler 204 interfaces with and controls operation of the example non-volatile memory 112. For example, the memory handler 204 may be a memory controller for configuring and controlling the example non-volatile memory 204.

The example memory mapper 206 performs memory mapping of the example non-volatile memory 206 via the example memory handler 204. The memory mapper 206 controls operation of the non-volatile memory 112 as memory mapped I/O.

The example firmware handler 208 is a controller that handles copying, compressing, decompressing, and formatting of firmware, boot code, etc. For example, the firmware handler 208 of the illustrated example is responsible for locating firmware (e.g., stored on the serial flash memory 118 or another storage location), decompressing the firmware if needed, and copying the firmware to the non-volatile memory 112 via the example memory handler 204. The example firmware handler 208 configures the reset vector location of the processing unit 102 via the processing unit interface 210.

The example processing unit interface 210 is an interface to couple the microcontroller 120 to the processing unit 102 via the example platform controller 116.

While an example manner of the microcontroller 120 of FIG. 1 is illustrated in FIG. 2, one or more of the elements, processes and/or devices illustrated in FIG. 2 may be combined, divided, re-arranged, omitted, eliminated and/or implemented in any other way. Further, the example input interface 202, the example memory handler 204, the example memory mapper 206, the example firmware handler 208, the example processing unit interface 210 and/or, more generally, the example microcontroller 120 may be implemented by hardware, software, firmware and/or any combination of hardware, software and/or firmware. Thus, for example, any of the example input interface 202, the example memory handler 204, the example memory mapper 206, the example firmware handler 208, the example processing unit interface 210 and/or, more generally, the example microcontroller 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input interface 202, the example memory handler 204, the example memory mapper 206, the example firmware handler 208, the example processing unit interface 210 and/or, more generally, the example microcontroller 120 is/are hereby expressly defined to include a non-transitory computer readable storage device or storage disk such as a memory, a digital versatile disk (DVD), a compact disk (CD), a Blu-ray disk, etc. including the software and/or firmware. Further still, the example microcontroller 120 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

For example, some or all operations performed by the microcontroller 120 may be implemented by instructions stored in a memory(s) executed by a processor(s) (e.g., instructions stored in the example read only memory 104 and executed by the processing unit 102).

Figure 3:
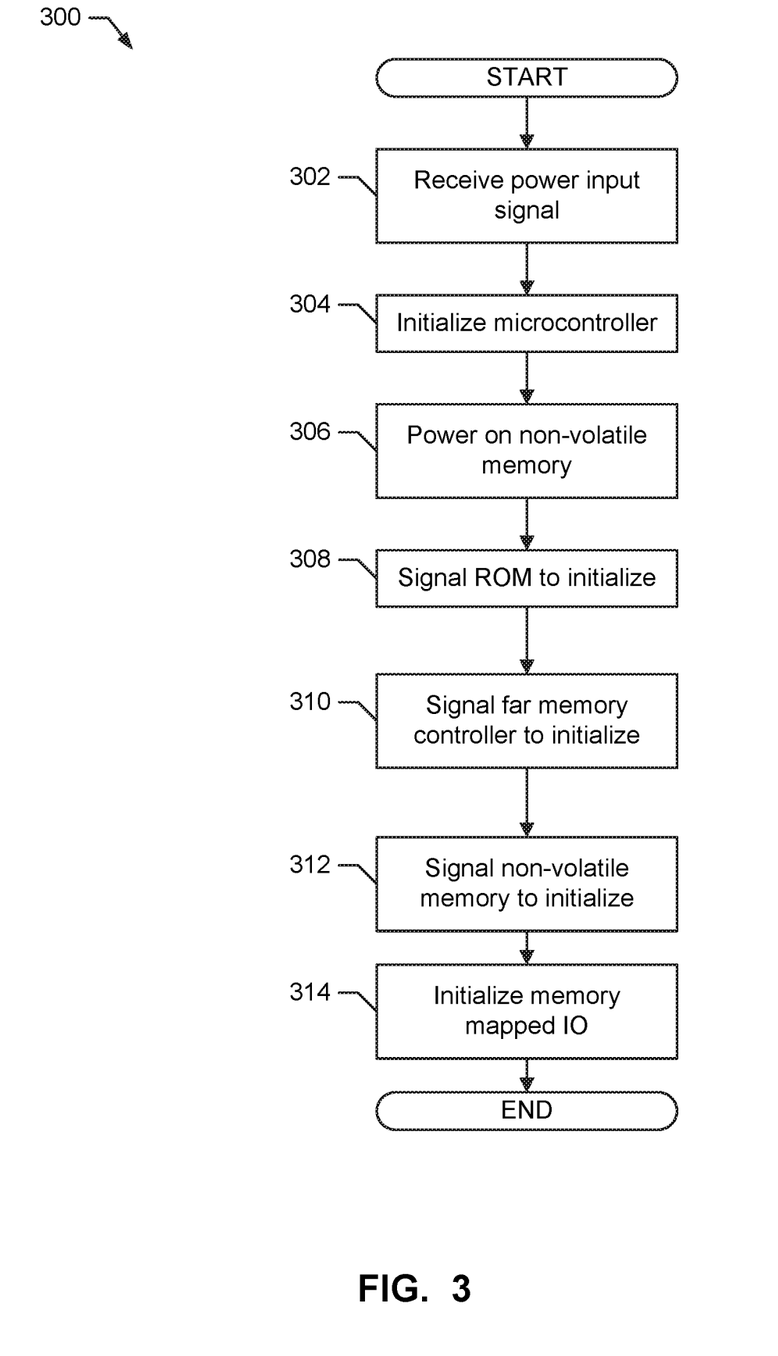
FIGS. 3-5 are flowcharts representative of machine readable instructions which may be executed to implement the microcontroller of FIG. 1 and/or FIG. 2.
Figure 4:
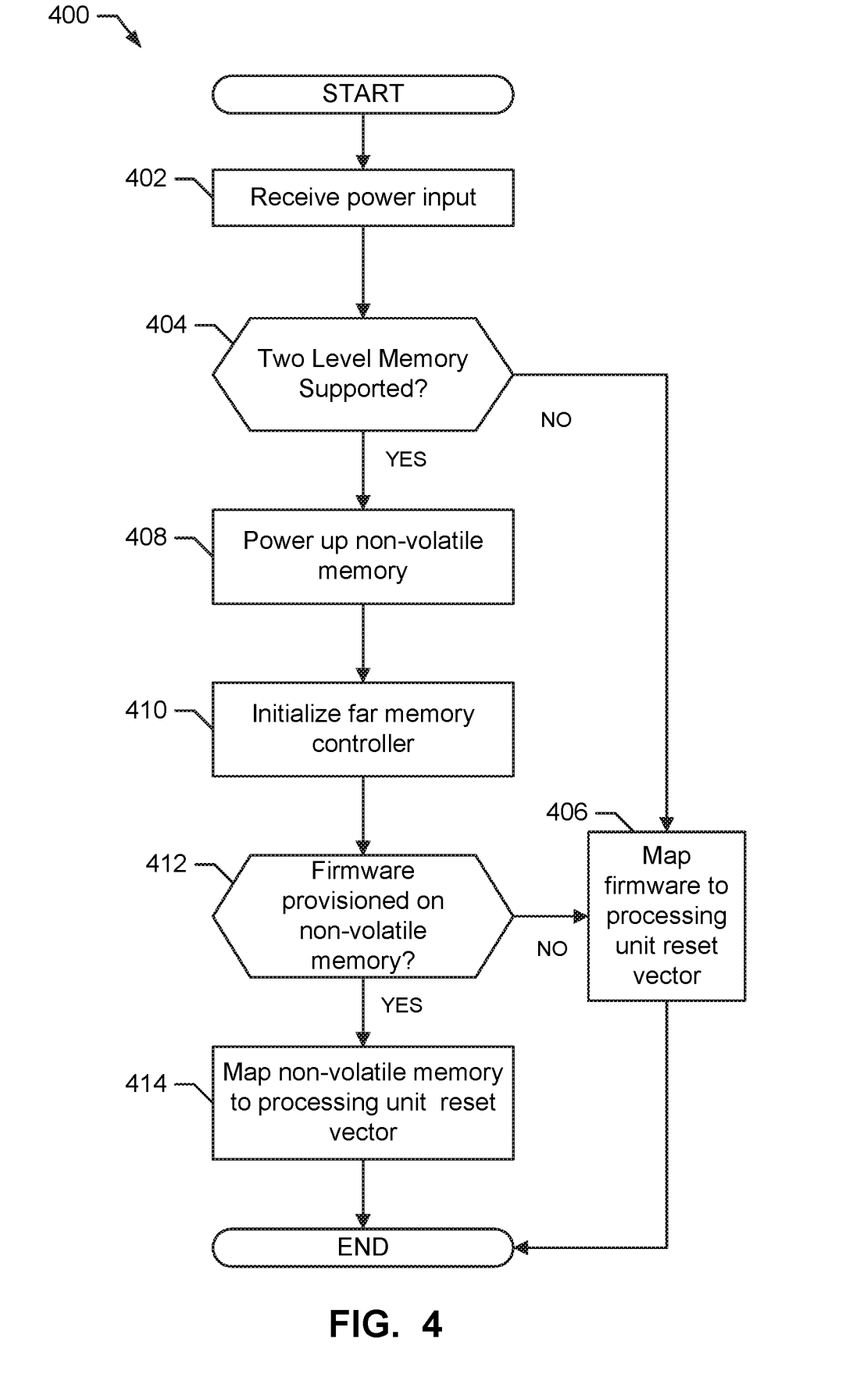
Figure 5:
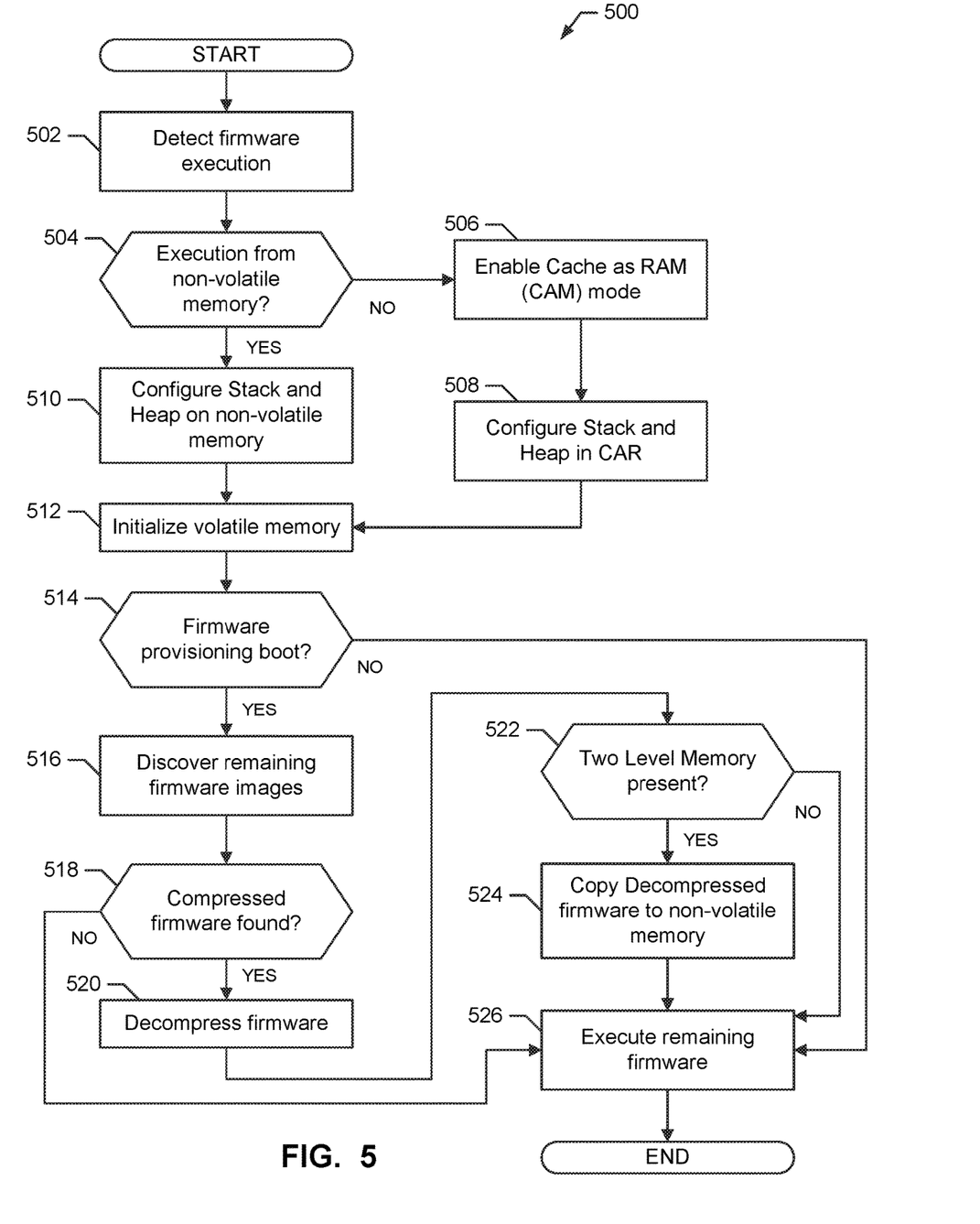

Flowcharts representative of example hardware logic, machine readable instructions, hardware implemented state machines, and/or any combination thereof for implementing the microcontroller 120 are shown in FIGS. 3-5. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example programs described with reference to the flowcharts illustrated in FIGS. 3-5, many other methods of implementing the example microcontroller 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 300 illustrated in FIG. 3 operates to initialize components of the example platform 100. The example program 300 begins when the input interface 202 of the example microcontroller 120 receive a power input signal from the example power input 122 (block 302).

The example input interface 202 initializes the example microcontroller 120 (block 304). The example memory handler 204 powers on the example non-volatile memory 112 (block 306). For example, the memory handler 204 may toggle a general purpose IO (GPIO) linked to the non-volatile memory 110, enable a voltage regulator (VR) responsible for powering on the non-volatile memory 110, etc.

The example processing unit interface 210 signals the example read only memory 104 to initialize (block 308). The example processing unit interface 210 signals the far memory controller 110 to initialize via the example read only memory 104 (block 310). The example processing unit interface 210 signals the far memory controller 110 to initialize the non-volatile memory 112 (block 312). For example, the far memory controller 110 may, in response to the signal from the processing unit interface 210, initialize the bus coupling the non-volatile memory 110 to the processing unit 102. For example, the non-volatile memory 110 may be coupled to the processing unit 102 via a peripheral component interconnect express (PCIe) bus. In such an example, initializing the bus includes performing a link training for device detection and data transfer between the processing unit 102 and the non-volatile memory 110. Additionally or alternatively, the initializing may include the far memory controller 110 detecting the type of the non-volatile memory 110 and configuring an initial mode for the device (e.g., one level memory, two level memory, etc.).

The example memory mapper 206 then initiates memory mapped IO (MMIO) at the non-volatile memory 112 to enable access by the processing unit 102 to the non-volatile memory 112 (block 314).

After initializing the components of the platform 100 the program 300 of FIG. 3 terminates. Accordingly, after the program 300 completes, the processing unit 102 is ready for executing boot code that is stored at the non-volatile memory 112 because the non-volatile memory 112 has been powered on, initialized, and prepared for memory mapped IO for access by the processing unit 102. For example, if the reset vector of the processing unit 102 has been set to identify a The program of 400 of FIG. 4 is a boot flow for operating the example platform 100. The example program 400 begins when the example input interface 202 receives a power input signal from the example power input 122 (block 402). The example memory handler 204 determines if the platform 100 includes memory that supports two level memory mode (block 404). For example, the memory handler 204 may include a configuration setting indicating whether the non-volatile memory 112 supports two level memory, may access the non-volatile memory 112 to determine if two level memory mode is supported, etc.

When the memory handler 204 determines that two level memory is not present and/or supported (block 404), the example memory mapper 206 maps the reset vector of the processing unit 102 to firmware (e.g., the serial flash memory 118 (block 406) and the program of FIG. 4 ends.

When the memory handler 204 determines that two level memory is present and supported (block 404), the example memory handler 204 powers on the non-volatile memory 112 (block 408). The example processing unit interface 210 initializes the read only memory 104 to initialize the far memory controller 110 (block 410). The example firmware handler 208 determines if the firmware is already provisioned on the non-volatile memory 112 (block 410). When the firmware is not provisioned on the non-volatile memory 112, the memory mapper 206 maps the reset vector of the processing unit 102 to the firmware (block 412) and the program 400 terminates.

When the firmware is provisioned on the non-volatile memory 112 (block 412), the example memory mapper 206 maps the reset vector of the processing unit 102 to the non-volatile memory 112 (block 414). The program 400 then terminates.

The program 500 of FIG. 5 is executed when execution of firmware (e.g., boot code) is detected by the processing unit interface 210 (block 502). For example, after execution of the program 300 of FIG. 3 and/or the program 400 of FIG. 4, the processing unit 102 begins executing the firmware from the location identified by the reset vector.

The example processing unit interface 210 determines if execution if from the non-volatile memory 112 (block 504). For example, the processing unit interface 210 may examine the reset vector of the processing unit 102 to determine the location from which the firmware/boot code is executed. When the execution is not from the non-volatile memory 112, the example processing unit interface 210 enables cache as RAM mode (block 506). The example processing unit interface 210 instructs the processing unit 102 to configure execution stack and heap in CAR (block 508). Control then proceeds to block 512.

When the execution is determined to be from the non-volatile memory 112 (block 504) the example processing unit interface 210 configures the processing unit 102 to utilized stack and heap on the non-volatile memory (block 510).

After configuring the heap and stack (block 508 or block 510), the example processing unit interface 210 instructs the system agent 108 to initialize the volatile memory (e.g., the main memory) (block 512).

The example firmware handler 208 then determines if this boot of processing unit 102 and/or the platform 100 is a firmware provisioning boot (block 514). For example, the firmware handler 208 determines if the boot is a provisioning of new firmware, updated firmware, first provisioning of firmware to the non-volatile memory 112, etc. When the firmware handler 208 determines that this boot is not a firmware provisioning boot, control proceeds to block 526 to execute any remaining firmware from the main memory implemented by the volatile memory 114.

When the firmware handler 208 determines that firmware provisioning is desired/needs (block 514), the example firmware handler 208 identifies available firmware images (e.g., stored on the serial flash memory 118 or other storage location) (block 516). The example firmware handler 208 determines if the identified firmware is compressed (block 518). For example, the firmware may be compressed to fit in the limited space available on the serial flash memory 118 or other storage. When a compressed firmware image is not located, control proceeds to block 526 to continue execution.

When the compressed firmware image is identified (block 518), the example firmware handler 208 decompressed the firmware (block 520).

The example memory handler 204 determines if two level memory is present (block 522). For example, the memory handler 204 may query the availability of the non-volatile memory 112, may determine an operating mode (e.g., 1 level memory, 2 level memory, etc.), etc. When two level memory is not present, control proceeds to block 526 to continue execution in conventional operation.

When two level is present (block 522), the example firmware handler 208 copies the decompressed firmware to the example non-volatile memory via the example memory handler 204 (block 524).

After determining that firmware provisioning is not to be performed (block 514), determining that compressed firmware is not found (block 518), determining that two level memory is not present (block 522), or copying the decompressed firmware to the non-volatile memory 112 (block 524), the example processing unit interface 210 executes any remaining firmware (e.g., executes remaining firmware stored in the volatile memory 114, the non-volatile memory 112, the serial flash memory 118, etc.).

While FIGS. 4 and 5 illustrate one example process for provisioning firmware and executing from the example non-volatile memory 110, variations of how firmware is provisioned are possible.

In one example, the firmware is provisioned from an external provisioning mechanism (e.g., a USB device in DnX mode) eliminating the need for loading the firmware from the read only memory 104. The firmware image may be stored in compressed or uncompressed format on the external provisioning mechanism and may be copied from the external provisioning mechanism to the non-volatile memory 110. If the provisioning is performed with a device that is not operating a firmware image (e.g., a new device on which firmware has not yet been loaded and is not stored in the read only memory 104), the reset vector of the processing unit 102 is initially set to identify the non-volatile memory 110.

In a second example, a firmware image may be copied, by the read only memory 104, from an available storage (e.g., the serial flash memory 118) to the non-volatile memory 110 on first boot. In such an example, upon initializing the read only memory 104, the read only memory 104 causes a first stage of the firmware (e.g., a first stage responsible for initializing the volatile memory 114 as main memory) which is stored uncompressed on some available storage (e.g., the serial flash memory 118) to be loaded onto the non-volatile memory 110. The reset vector of the processing unit 102 is initially set to the non-volatile memory 110 to start execution of the first stage of the firmware from the non-volatile memory 110. Later stages of firmware may be stored compressed on the available storage (e.g., the serial flash memory 118) and are, thus, retrieved, uncompressed, and copied to the non-volatile memory 110. On subsequent boots, the firmware will be already stored on the non-volatile memory 110 and, thus, will not need to be retrieved from the available storage (e.g., the serial flash memory 118) by the read only memory 104. Such an approach requires the read only memory 104 be capable of interfacing with the non-volatile memory 110 to provide the initial provisioning.

In a third example, firmware is loaded from an available storage (e.g., the serial flash memory 118, a storage that does not support two level memory, etc.) without needing the read only memory 104 to be available and/or configured with the capability for handling the provisioning. In such an example, a first stage of the firmware is stored in an uncompressed format on the available storage. The initial reset vector of the processing unit 102 is pointed to the available storage to execute the first stage of the firmware from the available storage to initialize the volatile memory 114 as main memory. The first stage of the firmware is configured to discover additional stages of firmware (e.g., block 516 of FIG. 5) and to decompress them if they are compressed (blocks 518 and 520 of FIG. 5). The first stage of the firmware copies itself and the additional stages (e.g., after any decompression) to the non-volatile memory 110 where it will be accessed for subsequent booting. In such an example, a custom read only memory 104 is not required.

FIG. 6 is a block diagram of an example layout that may be applied to the example non-volatile memory 110 operating as two level memory. According to the illustrated example, the non-volatile memory 110 is configured to include three separate partitions: an example operating system useable region 602, an example host firmware data partition 604, and an example host firmware boot partition 606.

The example operating system useable region 602 may be used by the operating system for any purpose (e.g., user storage space, operating system files, etc.).

The example host firmware data partition 604 is a dedicated region for storing host firmware data.

The example host firmware boot partition 606 is a dedicated region for storing firmware/boot code for the platform 100.

The example host firmware data partition 604 and the example host firmware boot partition 606 of the illustrated example are each less than 100 MB while the example operating system usable region 602 is more than 1 GB in size. Alternatively, other configurations and relative allocations are of space may be utilized. According to the illustrated example, the host firmware code is UEFI firmware code and the example host firmware data is UEFI variables. Alternatively, any other type of firmware code and data may be utilized.

Figure 7:
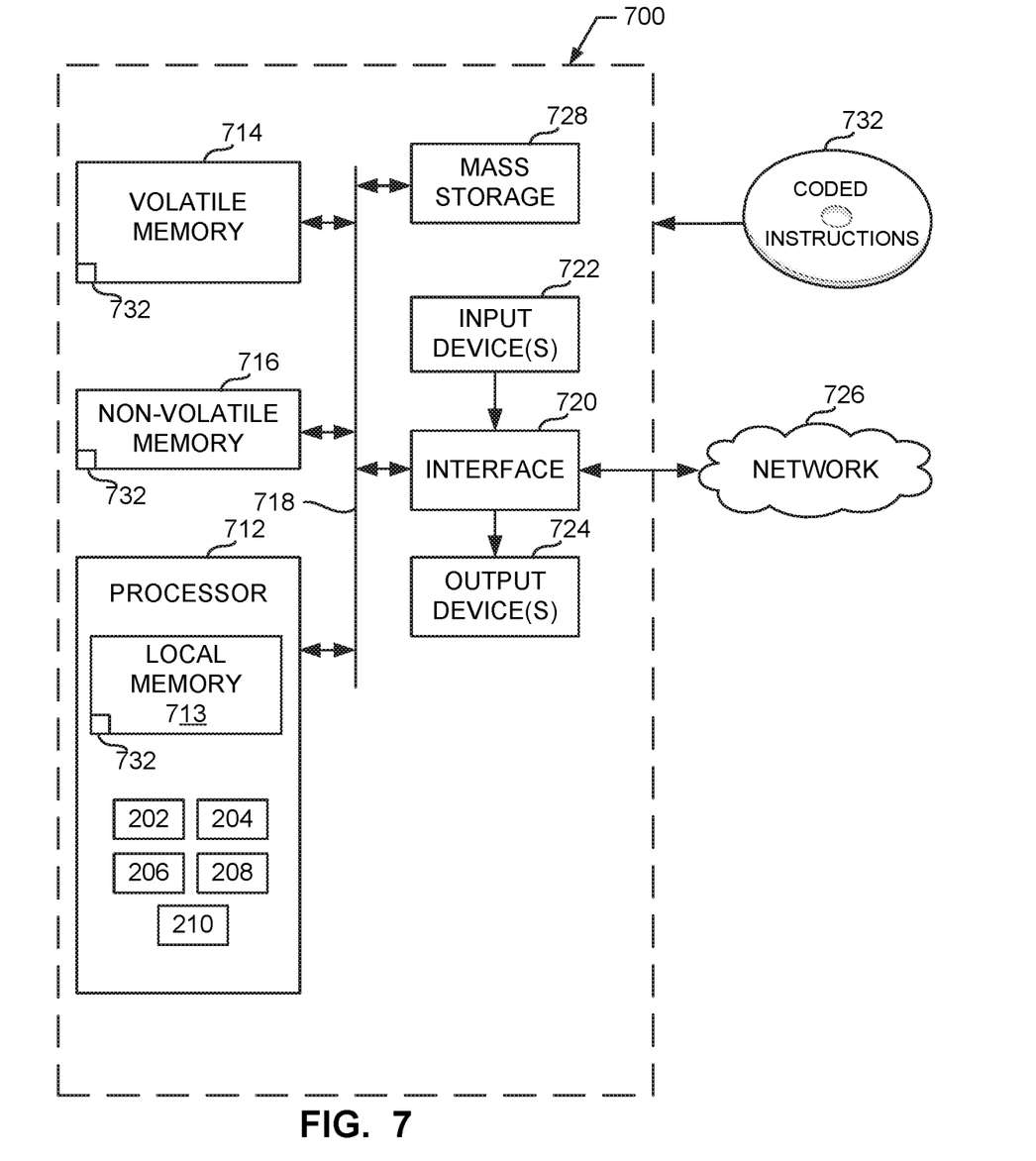
FIG. 7 is a block diagram of an example processing platform structured to execute the instructions of FIG. 3-5 to implement the example microcontroller of FIG. 1 and/or FIG. 2.

FIG. 7 is a block diagram of an example processor platform 700 structured to execute the instructions of FIGS. 3-5 to implement the microcontroller 120 of FIG. 1 and/or FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input interface 202, the example memory handler 204, the example memory mapper 206, the example firmware handler 208, and the example processing unit interface 210.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-5 may be stored in the mass storage device 728, in the volatile memory 714, in the non-volatile memory 716, and/or on a removable non-transitory computer readable storage medium such as a CD or DVD.

Example 1 includes a processor platform comprising a non-volatile memory coupled to a processing unit via a bus, and a microcontroller to configure the processing unit to store, on the non-volatile memory, a heap and a stack for execution of boot code, and configure the processing unit to execute the boot code stored on the non-volatile memory.

Example 2 includes a processor platform as defined in example 1, wherein the non-volatile memory stores files of an operating system installed on the processor platform.

Example 3 includes a processor platform as defined in example 1, wherein the non-volatile memory is two level memory that is capable of operating as volatile memory and non-volatile memory.

Example 4 includes a processor platform as defined in example 1, wherein the non-volatile memory includes a first partition for storing files of an operating system installed on the processor platform and a second partition for storing the boot code.

Example 5 includes a processor platform as defined in example 4, wherein the non-volatile memory includes a third partition for storing data for the boot code.

Example 6 includes a processor platform as defined in example 1, wherein the microcontroller is to transfer at least one of the boot code and boot data from a storage device to the non-volatile memory.

Example 7 includes a processor platform as defined in example 6, wherein the microcontroller is further to decompress at least one of the boot code and the boot data from the storage device before transferring the decompressed at least one of the boot code and the boot data to the non-volatile memory.

Example 8 includes a processor platform as defined in example 6, wherein the storage device is a flash storage device coupled to the processing unit via a platform controller.

Example 9 includes a processor platform as defined in example 1, wherein the microcontroller is to configure a reset vector of the processing unit to point to the non-volatile memory.

Example 10 includes a processor platform as defined in example 1, wherein the processing unit includes a far memory controller coupled to the non-volatile memory to communicate with the non-volatile memory.

Example 11 includes a non-transitory computer readable medium comprising instructions that, when executed, cause a machine to configure a processing unit to store, on a non-volatile memory, a heap and a stack for execution of boot code, and configure the processing unit to execute the boot code stored on the non-volatile memory.

Example 12 includes a non-transitory computer readable medium as defined in example 11, wherein the non-volatile memory stores files of an operating system installed.

Example 13 includes a non-transitory computer readable medium as defined in example 11, wherein the non-volatile memory is two level memory that is capable of operating as volatile memory and non-volatile memory.

Example 14 includes a non-transitory computer readable medium as defined in example 11, wherein the non-volatile memory includes a first partition for storing files of an operating system and a second partition for storing the boot code.

Example 15 includes a non-transitory computer readable medium as defined in example 14, wherein the non-volatile memory includes a third partition for storing data for the boot code.

Example 16 includes a non-transitory computer readable medium as defined in example 11, wherein the instructions, when executed, cause the machine to transfer at least one of the boot code and boot data from a storage device to the non-volatile memory.

Example 17 includes a non-transitory computer readable medium as defined in example 16, wherein the instructions, when executed, cause the machine to decompress at least one of the boot code and the boot data from the storage device before transferring the decompressed at least one of the boot code and the boot data to the non-volatile memory.

Example 18 includes a non-transitory computer readable medium as defined in example 16, wherein the storage device is a flash storage device coupled to the processing unit via a platform controller.

Example 19 includes a non-transitory computer readable medium as defined in example 11, wherein the instructions, when executed, cause the machine to configure a reset vector of the processing unit to point to the non-volatile memory.

Example 20 includes a non-transitory computer readable medium as defined in example 11, wherein the processing unit includes a far memory controller coupled to the non-volatile memory to communicate with the non-volatile memory.

Example 21 includes a method comprising configuring a processing unit to store, on a non-volatile memory, a heap and a stack for execution of boot code, and configuring the processing unit to execute the boot code stored on the non-volatile memory.

Example 22 includes a method as defined in example 21, wherein the non-volatile memory stores files of an operating system.

Example 23 includes a method as defined in example 21, wherein the non-volatile memory is two level memory that is capable of operating as volatile memory and non-volatile memory.

Example 24 includes a method as defined in example 21, wherein the non-volatile memory includes a first partition for storing files of an operating system and a second partition for storing the boot code.

Example 25 includes a method as defined in example 24, wherein the non-volatile memory includes a third partition for storing data for the boot code.

Example 26 includes a method as defined in example 21, further including transferring at least one of the boot code and boot data from a storage device to the non-volatile memory.

Example 27 includes a method as defined in example 26, further including transferring decompressing at least one of the boot code and the boot data from the storage device before transferring the decompressed at least one of the boot code and the boot data to the non-volatile memory.

Example 28 includes a method as defined in example 26, wherein the storage device is a flash storage device coupled to the processing unit via a platform controller.

Example 29 includes a method as defined in example 21, further including configuring a reset vector of the processing unit to point to the non-volatile memory.

Example 30 includes a method as defined in example 21, wherein the processing unit includes a far memory controller coupled to the non-volatile memory to communicate with the non-volatile memory.

Example 31 includes a processor platform comprising means for storing coupled to a processing unit via a bus, and means for configuring to configure the processing unit to store, on the means for storing, a heap and a stack for execution of boot code, and execute the boot code stored on the means for storing.

Example 32 includes a processor platform as defined in example 31, wherein the means for storing is to store files of an operating system installed on the processor platform.

Example 33 includes a processor platform as defined in example 1, wherein the means for configuring is to configure a reset vector of the processing unit to point to the means for storing.

Example 34 is a system including a two level non-volatile memory; a processing unit coupled to the non-volatile memory via a bus; and a microcontroller to: store, on the two level non-volatile memory, a heap and a stack for execution of boot code; and configure the processing unit to execute the boot code stored on the two level non-volatile memory.

Example 35 includes a processor platform as defined in example 31, wherein the two level non-volatile memory is to store files of an operating system.

Example 36 includes a processor platform as defined in example 31, wherein the microcontroller is to configure a reset vector of the processing unit to point to the means for storing.

From the foregoing, it will be appreciated that example methods, apparatus and articles of manufacture have been disclosed that facilitate the use of non-volatile memory for computer system boot and operation. The disclosed methods, apparatus and articles of manufacture improve the efficiency of using a computing device by utilizing non-volatile memory (e.g., far memory, two level memory, etc.) typically not used for system operations (e.g., storing boot code, storing boot data, storing firmware in uncompressed form, etc.) a processing unit may be freed to use local cache or other near memory for a hierarchical cache. For example, instead of storing a heap and/or stack in the cache, the processing unit may be controlled to store the heap and/or the stack in the non-volatile memory. In some examples, a processor platform that utilizes the non-volatile memory for storage of boot code may be implemented without discrete components such as a SPI NOR chip which reduces the cost and complexity of the processing platform. Furthermore, boot times for such a processor platform may be reduced by eliminating usage of CPU CAR and eliminating the need for decompressing boot code at each boot. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A processor platform comprising:
    a non-volatile memory coupled to a processing unit via a bus; and
    a logic circuit to:
        copy boot code and host firmware data to the non-volatile memory during a first boot process;
        determine, during a subsequent boot process and prior to initialization of the processing unit, whether the host firmware data for the processor platform is provisioned on the non-volatile memory or another memory; and
        in response to a determination that the host firmware data is provisioned on the non-volatile memory, map a reset vector of the processing unit to the non-volatile memory to configure the processing unit to execute the boot code stored on the non-volatile memory the with a heap and a stack stored on the non-volatile memory.

2. A processor platform as defined in claim 1, wherein the non-volatile memory stores files of an operating system installed on the processor platform.

3. A processor platform as defined in claim 1, wherein the non-volatile memory is two level memory that is capable of operating as volatile memory and non-volatile memory.

4. A processor platform as defined in claim 1, wherein the logic circuit is to transfer at least one of the boot code and boot data from a storage device to the non-volatile memory.

5. A processor platform as defined in claim 4, wherein the logic circuit is further to decompress at least one of the boot code and the boot data from the storage device before transferring the decompressed at least one of the boot code and the boot data to the non-volatile memory.

6. A processor platform as defined in claim 4, wherein the storage device is a flash storage device coupled to the processing unit via a platform controller.

7. A processor platform as defined in claim 1, wherein the processing unit includes a far memory controller coupled to the non-volatile memory to communicate with the non-volatile memory.

8. A processor platform as defined in claim 1, wherein the logic circuit is to:
    configure the processing unit to store, on the non-volatile memory, the heap and the stack for execution of the boot code, wherein the non-volatile memory includes a first partition to store files of an operating system installed on the processor platform, a second partition to store the boot code, and a third partition to store host firmware data; and
    configure the processing unit to begin the first boot process using boot code stored on a storage device to initialize main memory.

9. A non-transitory computer readable medium comprising instructions that, when executed, cause a machine to:
    copy boot code and host firmware data to a non-volatile memory during a first boot process;
    determine, during a subsequent boot process and prior to initialization of a processing unit, whether the host firmware data for a processor platform is provisioned on the non-volatile memory or another memory; and
    in response to a determination that the host firmware data is provisioned on the non-volatile memory, map a reset vector of the processing unit to the non-volatile memory to configure the processing unit to execute the boot code stored on the non-volatile memory with a heap and a stack stored on the non-volatile memory.

10. A non-transitory computer readable medium as defined in claim 9, wherein the non-volatile memory stores files of an operating system.

11. A non-transitory computer readable medium as defined in claim 9, wherein the non-volatile memory is two level memory that is capable of operating as volatile memory and non-volatile memory.

12. A non-transitory computer readable medium as defined in claim 9, wherein the instructions, when executed, cause the machine to transfer at least one of the boot code and boot data from a storage device to the non-volatile memory.

13. A non-transitory computer readable medium as defined in claim 12, wherein the instructions, when executed, cause the machine to decompress at least one of the boot code and the boot data from the storage device before transferring the decompressed at least one of the boot code and the boot data to the non-volatile memory.

14. A non-transitory computer readable medium as defined in claim 12, wherein the storage device is a flash storage device coupled to the processing unit via a platform controller.

15. A non-transitory computer readable medium as defined in claim 9, wherein the processing unit includes a far memory controller coupled to the non-volatile memory to communicate with the non-volatile memory.

16. A non-transitory computer readable medium as defined in claim 9, wherein the instructions, when executed, cause the machine to:
   configure the processing unit to store, on the non-volatile memory, the heap and the stack for execution of the boot code, wherein the non-volatile memory includes a first partition to store files of an operating system installed on the processor platform, a second partition to store the boot code, and a third partition to store host firmware data; and
   configure the processing unit to begin the first boot process using boot code stored on a storage device to initialize main memory.

17. A method comprising:
   copying boot code and host firmware data to a non-volatile memory during a first boot process;
   determining, during a boot process subsequent to the first boot process and prior to initialization of a processing unit, the host firmware data for a processor platform is provisioned on the non-volatile memory; and
   mapping a reset vector of the processing unit to the non-volatile memory to configure the processing unit to execute the boot code stored on the non-volatile memory with a heap and a stack stored on the non-volatile memory.

18. A method as defined in claim 17, wherein the non-volatile memory stores files of an operating system.

19. A method as defined in claim 17, wherein the non-volatile memory is two level memory that is capable of operating as volatile memory and non-volatile memory.

20. A method as defined in claim 17, further comprising:
   configuring the processing unit to store, on the non-volatile memory, the heap and the stack for execution of the boot code, wherein the non-volatile memory includes a first partition to store files of an operating system installed on the processor platform, a second partition to store the boot code, and a third partition to store host firmware data; and
   configuring the processing unit to begin the first boot process using boot code stored on a storage device to initialize main memory.

* * * * *